G. WANDSCHEER.
CORN SHELLER.
APPLICATION FILED JAN. 18, 1909.
929,735.
Patented Aug. 3, 1909.
4 SHEETS—SHEET 3.
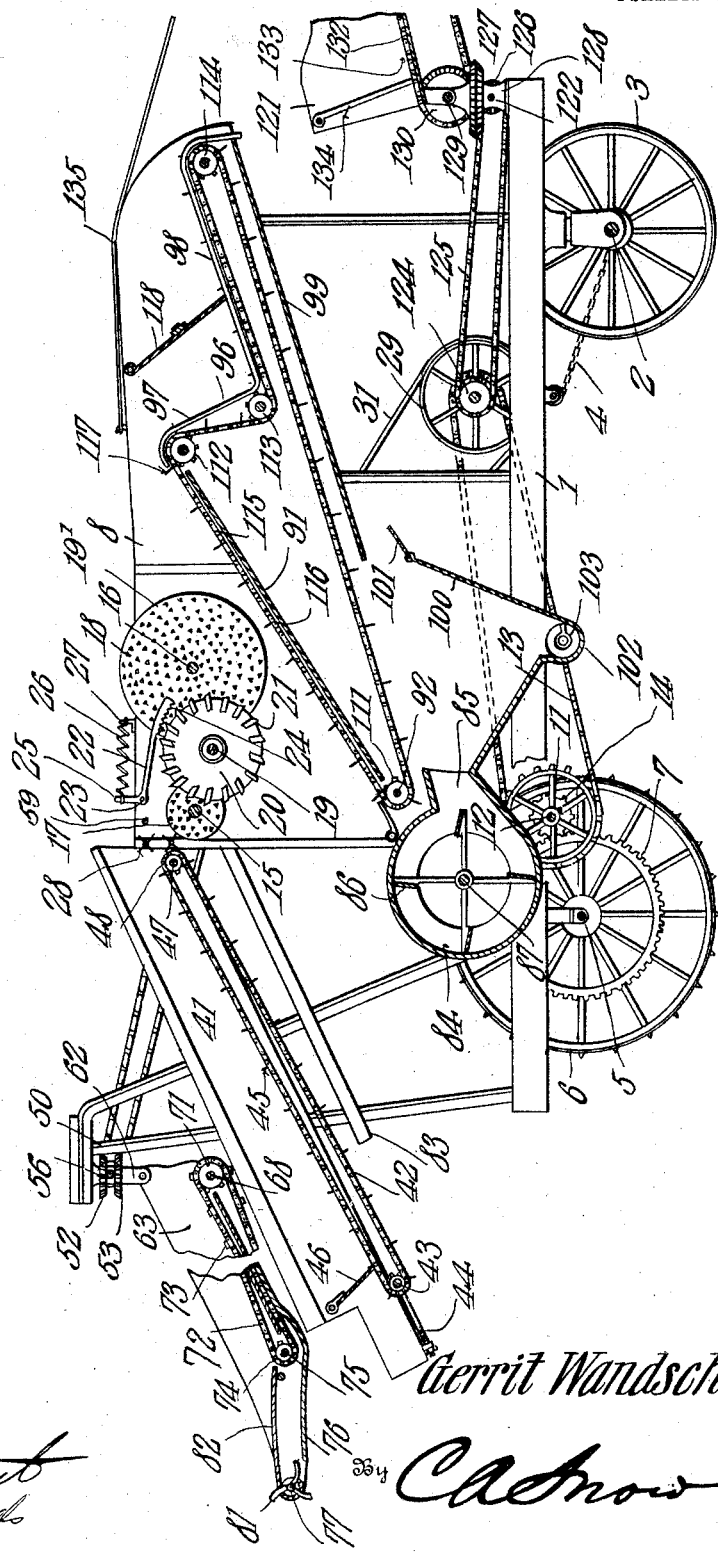
Witnesses
Inventor
Gerrit Wandscheer.
By C. A. Snow & Co.
Attorneys G. WANDSCHEER.
CORN SHELLER.
APPLICATION FILED JAN. 18, 1909.
929,735.
Patented Aug. 3, 1909.
4 SHEETS—SHEET 4.
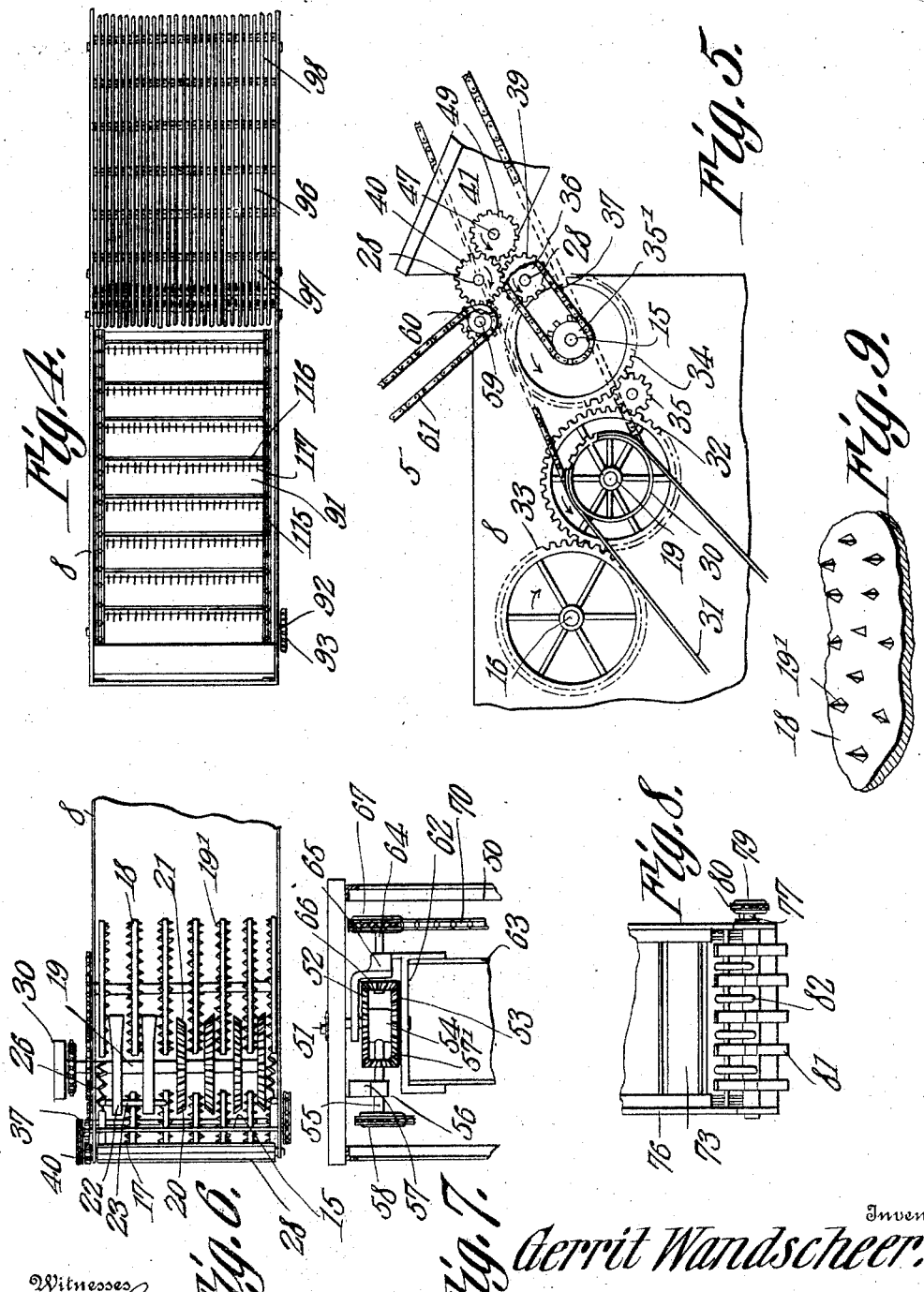

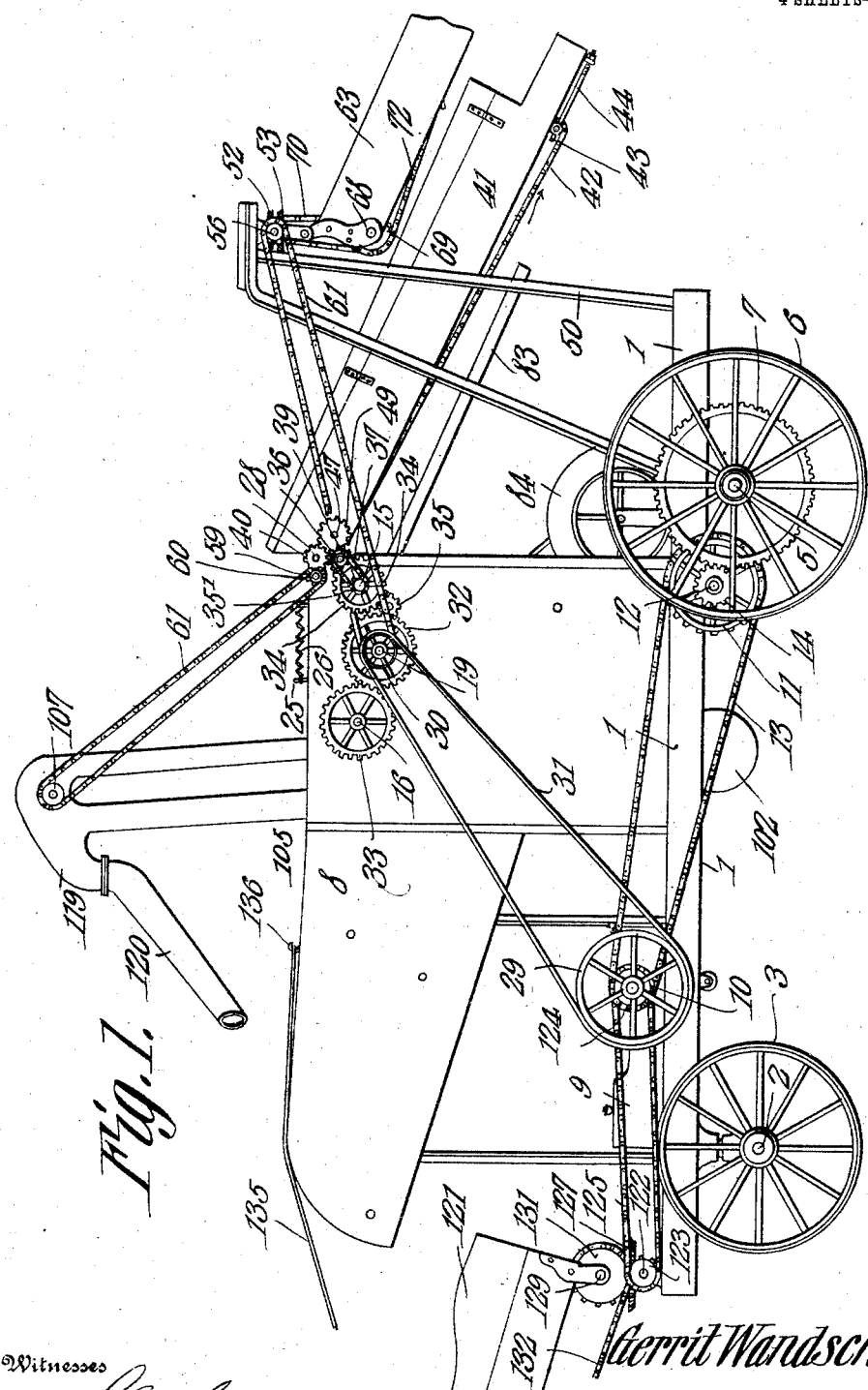

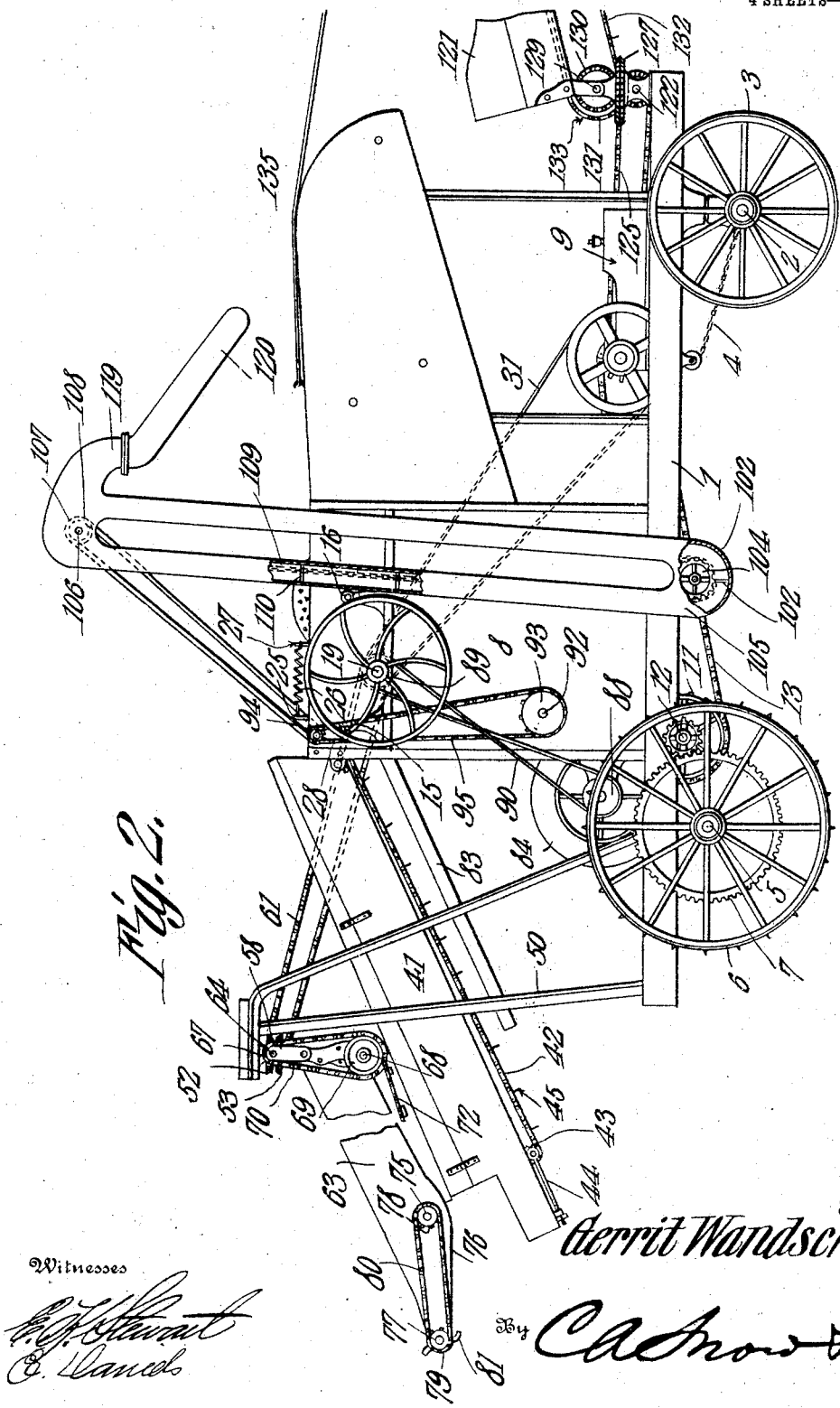

UNITED STATES PATENT OFFICE.

GERRIT WANDSCHEER, OF SPRINGFIELD, SOUTH DAKOTA.

CORN-SHELLER.

No. 929,735.  Specification of Letters Patent.  Patented Aug. 3, 1909.

Application filed January 18, 1909. Serial No. 472,870.

*To all whom it may concern:*

Be it known that I, GERRIT WANDSCHEER, a citizen of the United States, residing at Springfield, in the county of Bonhomme and State of South Dakota, have invented a new and useful Corn-Sheller, of which the following is a specification.

This invention has relation to corn shellers and it consists in the novel construction and arrangement of its parts hereinafter shown and described.

The object of the invention is to provide a corn sheller the body of which is composed entirely of metal, preferably sheet iron and steel; thereby effecting sufficient rigidity of the body to enable the placing of an operating engine thereon with which is connected operative means for moving the sheller, and also means for actuating the movable parts of the sheller.

A further object of the invention is to provide a means for automatically picking up and throwing ears of corn, which ears are selected from a pile, and directing the same toward a conveyer which operates in a feeding trunk; thereby avoiding the necessity of manually lifting and pitching the corn to feed the sheller.

A further object of the invention is to provide, in the body of the sheller, spring pressers of peculiar configuration and arrangement and adapted to effectually present ears of corn to the shelling disks.

A still further object of the invention is to provide, within the body of the sheller, an endless conveyer which describes an orbit of peculiar configuration and which coöperates with a series of spaced rods and a fan for the purpose of separating the cobs from the shelled grain, and also for the purpose of separating the chaff from the grain.

In the accompanying drawings:—Figure 1 is a side elevation of the corn sheller, with parts broken away. Fig. 2 is an elevation of the opposite side of the corn sheller, with parts broken away. Fig. 3 is a vertical longitudinal sectional view of the corn sheller, with parts broken away. Fig. 4 is a plan view of an endless conveyer used in the body of the corn sheller. Fig. 5 is a detailed enlarged view of gear wheels and chains for operating the sheller disks and adjacent parts. Fig. 6 is a plan view of the shelling disks and presser springs. Fig. 7 is a detailed side elevation of means for pivotally connecting the feeder trunk with the frame of the corn sheller. Fig. 8 is an end elevation of the ear-selecting and pitching means, located at the receiving end of the ear-feeding trunk. Fig. 9 is a detailed perspective view of a portion of one of the rolling disks used in the machine.

The corn sheller consists of the bed 1, which is pivotally mounted at one end upon the axle 2, which, in turn, is supported by the ground wheels 3. Steering chains 4, (of the usual arrangement) are operatively connected with the pivoted axle 2 for the purpose of steering the same in the usual manner. The opposite end portion of the bed 1 is mounted upon the axle 5, which in turn is supported by the traction wheels 6. One of the said traction wheels 6 is provided with a gear rim 7, which is concentrically mounted upon the spokes of said wheel. A body 8 is mounted upon the bed 1 and is preferably formed of sheet metal. The said bed 1 and the framework of the machine mounted thereon is preferably formed from steel bars, hence effecting a rigid and durable structure. An engine 9, (preferably hydro-carbon) is mounted upon the bed 1 in the vicinity of that end thereof opposite to the end which is supported by the traction wheels 6. A sprocket wheel 10 is mounted upon the shaft of the engine 9, and a sprocket wheel 11 is mounted upon the stub shaft 12, which is journaled to the bed 1 in the vicinity of that traction wheel 6 upon which the gear rim 7 is mounted. A sprocket chain 13 passes around the sprocket wheels 10 and 11, and a pinion 14 is mounted upon the stub shaft 12 and meshes with the gear rim 7 in the manner as illustrated in Fig. 1 of the drawings. Thus means is provided for operatively connecting the said traction wheel 6 carrying the gear rim 7 with the engine shaft, and the said mechanism may be provided at any suitable point with a clutch mechanism (such clutch mechanism is not shown for the reason that it is a common expedient) whereby the said traction wheel may, at times, be thrown into gear with the engine for the purpose of advancing or moving the sheller as an entirety by stages.

The shafts 15 and 16 are journaled for rotation in the upper portion of the body 8, and the said shafts are provided with the sheller disks 17 and 18 respectively. The disks are mounted upon the said shafts in the usual manner, but each disk is provided, upon its faces, with the spurs 19′, which are triangular in cross section, and which terminate in apices at their outer ends, as illustrated in the detailed view in Fig. 9. A shaft 19 is journaled in the upper portion of the body 8 and is located between the shafts 15 and 16. Feeder disks 20 are mounted upon the shaft 19 and are provided at their edges with the serrations or spurs 21. The said feeder disks 20 are located between the adjacent disks 17 mounted upon the shaft 15 and also between the adjacent disks 18 mounted upon the shaft 16 and operates in the usual manner to pass the ears of corn or the cobs from the disks 17 toward the disks 18. Spring pressers 22 are pivotally mounted upon a cross rod 23 and are provided with serrated ends 24 which are located over the upper portions of the peripheries of the disks 20. Each spring presser 22 is provided at its opposite end with an upstanding lug 25 and coil springs 26 are connected at one end with the said lugs 25 and at their opposite ends with pins 27 which are fixed with relation to the body 8. The beaters 28 are journaled for rotation in the upper portion of the body 8 in advance of the shaft 15 upon which the disks 17 are mounted. As will hereinafter appear the said beaters 28 rotate toward each other.

A belt pulley 29 is located upon the shaft of the engine 9, and a belt pulley 30 is located upon the shaft 19 exteriorly of the body 8, as shown in Fig. 1 of the drawings. A belt 31 passes around the pulleys 29 and 30. A gear wheel 32 is located upon the shaft 19 exteriorly of the body 8 and meshes with a gear wheel 33 similarly located upon the shaft 16. A gear wheel 34 is similarly located upon the shaft 15 and meshes with a gear wheel 35 which is journaled upon the exterior of the body 8. The said gear wheel 35 also meshes with the gear wheel 32. A sprocket wheel 35' is mounted upon the shaft 15 exteriorly of the body 8, and a sprocket wheel 36 is mounted upon the shaft of the lower beater 28. The sprocket chain 37 passes around the sprocket wheels 35' and 36. A gear wheel 39 is mounted upon the shaft of the lower beater 28 and a gear wheel 40 is mounted upon the shaft of the upper beater 28. The said gear wheels 39 and 40 mesh with each other. By this arrangement it will be seen that means is provided for transmitting motion from the shaft of the engine 9 to the parts mounted upon the shafts 15, 16, 19, and the beaters 28.

A feed trough 41 is connected at one end with that end of the body 8, in the vicinity of the feeders 28, and the endless conveyer 42 is mounted for orbital movement along the bottom of the trough 41. The said trough 41 is poised in an inclined position, and the lower end portion of the conveyer 42 passes around the idle sprocket wheels 43, which are supported by the adjustable screw rods 44, the said rods forming means for regulating the tension or slack of the conveyer 42. The upstanding teeth 45 are mounted upon the conveyer 42, and the valve 46 is pivotally mounted in the lower portion of the trough 41 and lower edge of the said valve 46 rests upon the upper run of the conveyer 42. As the teeth 45 pass under the said valve 46 the valve 46 will engage the material resting upon the upper run of the belt 42 and will prevent the same from choking or clogging thereon. Thus the said valve 46 serves as a stirrer for the contents of the trough 41. The upper end of the conveyer 43 passes around a shaft 47 and the sprocket wheels 48 mounted thereon, which shaft and sprocket wheels are located at the upper end of the trough 41 and a gear wheel 49 is mounted upon the shaft 47 and is located exteriorly of the trough 41 and meshes with the gear wheel 40 above described. Thus means is provided for transmitting movement from the upper beater shaft 28 to the conveyer 42.

A derrick 50 is erected upon that end of the bed 1 supported by the traction wheels 6, and a depending spindle 51 is supported by the said derrick 50. The beveled gear wheels 52 and 53 are loosely journaled upon the spindle 51 and are held in spaced relation by means of the collar 54, which is interposed between the same. A stub shaft 56 is journaled in the bearing 57 which is supported by the derrick 50 and is provided at its inner end with a beveled pinion 57', which meshes with the beveled wheels 53 and 52. A sprocket wheel 58 is mounted upon the outer end of the shaft 55. A stub shaft 59 is mounted upon the exterior of the body 8, and the combined sprocket and gear wheel 60 is journaled upon the said stub shaft 59. The gear teeth of the wheel 60 mesh with the gear wheel 40, while the sprocket teeth of the wheel 60 are engaged by the sprocket chain 61, the upper portion of which passes around the sprocket wheel 58 mounted upon the shaft 55. The yoke 62 is pivotally supported upon the spindle 51 and is adapted to swing horizontally. The upper end of the conveyer trunk 63 is pivotally attached to said yoke, and said conveyer trunk 63 is free to swing vertically. A stub shaft 64 is journaled for rotation in the bearing 65 provided in the side of the yoke 62, and a beveled pinion 66 is fixed to the inner end of the shaft 64 and meshes with the beveled gear wheels 52 and 53. A sprocket wheel 67 is fixed to the outer end portion of the shaft 64. A shaft 68 is journaled for rotation in the upper end portion of the elevator trunk 63, and a sprocket wheel 69 is fixed to one end of the said shaft 68. A sprocket chain 70 passes around the sprocket wheels 67 and 69. Sprocket wheels 71 are mounted upon the intermediate portion of the shaft 68 and the chain belt 72 carrying the cross-slats 73, are arranged to move in orbits along the bottom of the conveyer trunk 63 and around the sprocket wheels 71 upon the shaft 67, and around the sprocket wheels 74 mounted upon the shaft 75, which, in turn, is journaled for rotation at the lower end portion of the said conveyer trunk 63. The lower end portion of the conveyer trunk 63 is formed into the spoon-shaped extremity 76, and the shaft 77 is journaled for rotation at the extremity of the said spoon portion 76. A sprocket wheel 78 is mounted upon the shaft 75 exteriorly of the conveyer trunk 63, and a sprocket wheel 79 is similarly located upon the shaft 77. A sprocket chain 80 passes around the sprocket wheels 78 and 79 and is adapted to transmit movement from the shaft 75 to the shaft 77. The ear-engaging and pitching fingers 81 are mounted upon the shaft 77 and are adapted to pick up and pitch the ears of corn, as will be hereinafter described. The partition bars or rods 82 are located in the spoon extremity 76 of the elevator trunk 63 and are rearwardly disposed from the shaft 77 toward the shaft 75. The portions of the partitions 82 adjacent the shaft 77 lie between the adjacent fingers 81 mounted upon the said shaft 77.

When the sheller is in operation the spoon-shaped extremity 76 of the elevator trunk 63 is adapted to rest upon the ground, and an operator may cause the sheller as an entirety to move upon its traction wheels as above described, whereby the said spoon-shaped extremity 76 may be projected under and into a pile of corn resting upon the ground. When the machine has been properly positioned as indicated, the power from the engine 9 is applied to the shafts 19, 15 and 16, above described, whereby the shelling members of the machine are set in motion, and the elevators and conveyers are simultaneously put into operation. By reason of the fact that the spoon-shaped extremity 76 of the elevator trunk 63 is projected into the corn as described, when the shaft 77 begins to rotate the fingers 81 carried thereby engage the ears of corn and pass the same along the partition rods or bars 82 toward the lower ends of the conveying chains 72 in the trunk 63. When the said ears of corn are engaged by the cross slats 73 of the said chains 62 they are carried up along the said conveyer trunk 63 and eventually are cast from the upper end of the said chain belt upon the conveyer 42 mounted in the trough 41. The said conveyer 42 carries the ears up and delivers them to the beaters 28. The beaters 28, revolving toward each other, grasp the ears and pass the same in between the disks 17. The disks 17 having upon their sides the triangular teeth as described, engage the ears and partially shell the grain from the same. The ears are then engaged by the teeth or serrations 21 of the feeding disks 20, which carry the same under the spring pressers 22, and the said pressers, together with the teeth or serrations upon the disks 20, hold the ears in position against the sides of the disks 18, which completes the shelling process. A return board 83 is located under the upper portion of the trough 41, and any ears which should be rejected by the beaters 28, or which should fall between the disks 17, will slide down upon the upper surface of the said board 83 and beyond the end of the bed 1 of the machine.

A fan casing 84 is connected with that end of the body 8 below the beaters 28, and is provided with a constricted outlet opening 85, which is directed under the shaft 16 and the disks 18 carried thereby. The fan 86 is mounted upon the shaft 87, which is journaled for rotation in the said casing 84, and the said shaft 87 is provided at one end with a pulley 88. A pulley 89 is mounted upon the shaft 19 exteriorly of the body 8, and the belt 90 passes around the pulleys 88 and 89. Thus means is provided for transmitting rotary movement to the fan shaft 87 and the fan 86 carried thereby. The inclined partition 91 is located in the body 8 between the outlet 85 of the fan casing 84, and the disks 17 and 18. The said partition 91 is inclined upwardly from the outlet of the said fan casing. The shaft 92 is journaled for rotation in the body 8, above the outlet 85 of the fan casing 84 and the sprocket wheel 93 is fixed to the end of the said shaft 92 and is located exteriorly of the body 8. A sprocket wheel 94 is fixed to the end of the shaft of the upper beater 28, and the sprocket chain 95 passes around the sprocket wheels 93 and 94. The spaced rods 96 are located in the body 8 at the upper end of the partition 91; the said rods 96 are provided with the downwardly inclined portion 97 and the upwardly inclined portion 98. In other words, the said rods, in side elevation, are in synclinal configuration. The inclined partition 99 forms the bottom of that end of the body 8 opposite the end thereof to which the fan casing 84 is attached, and the said partition 99 is disposed toward the fan outlet 85.

The hopper 100 is formed and located in the bottom of the body 8, and is located adjacent the outlet 85 of the fan casing 84. Said hopper 100 is provided at that edge opposite the edge thereof which communicates with the outlet 85 of the fan casing, with a pivoted valve 101, which is adapted to be swung at its free edge toward or away from the inner end portion of the partition 99. The hopper 100 is provided in its bottom with a basin 102, in which is located a grain auger 103. The shaft of the said auger is provided with a sprocket wheel 104. The grain elevator 105 is located exteriorly with relation to the body 8, and communicates at its lower end with the end of the basin 102 in which is located the grain auger 103. A shaft 106 is journaled for rotation at the upper end of the grain elevator 105 and is provided at its outer end with a sprocket wheel 107. The sprocket chain heretofore described passes around the sprocket wheel teeth 60 upon the shaft 59, and the sprocket wheel 107 above referred to. A sprocket wheel 108 is fixed to the shaft 106, and a chain belt 109 passes around the sprocket wheel 104, mounted upon the shaft of the grain auger 102, and around the sprocket wheel 108 mounted upon the shaft 106. The opposite runs of the said chain belt 109 are located in the opposite side portions of the elevator 105. The buckets or vanes 110 are carried by the chain belt 109.

The sprocket wheels 111 are mounted upon the shaft 92, and the idle sprocket wheels 112 are journaled for rotation in the body 8 and are located at the upper end of the partition 91. The idle sprocket wheels 113 are similarly journaled in the body 8 and are located below the sprocket wheels 112. The idle sprocket wheels 114 are journaled for rotation at the extreme end of the body 8 opposite that end thereof with which the fan casing 84 connects. The endless sprocket chains 115 pass around the wheels 111, 112, 113 and 114. By reason of the fact that the sprocket wheels 111 are located just over the fan casing outlet 85, and that the sprocket wheels 112 are located in the vicinity of the top of the body 8, and the sprocket wheels 113 are located below the wheels 112, and the sprocket wheels 114 are located above the wheels 113, it will be seen that the chain belts 115 describe orbits of peculiar configuration. That is to say, the upper run of the chain belts has one portion in inclined position below the disks 18, and its opposite end portion in synclinal position under the rods 96, and that the lower run of the said chain belts is inclined downwardly toward the fan casing 84 and passes along the inclined bottom partition 99 of the body 8.

When the material is deposited upon the upper inclined portion of the run of the chain belts 115 which lies immediately under the disks 18, the said material is carried up and over the sprocket wheels 112. The chain belts 115 are connected together by the transversely disposed bars 116, which have upon their outer sides the upstanding teeth 117, said bars and teeth constituting combs. As the material is engaged by the said combs, it is carried up as above described, and when the material arrives at the highest point of the upper run of the chain belts, it passes down along the downwardly disposed portions of the spaced rods 96, and at the same time a blast of air coming from the fan casing 84 through the outlet 85 passes through the material and directs the same against a pivoted valve 118, which is mounted in the body 8 and has its lower edge portion resting upon the outer end portion of the upper run of the said chain belts. When the material strikes the valve 118 the grain kernels rebound and pass down through the space between the rods 96, as does also small particles of cob and chaff. When the chain belts 115 pass from the sprocket wheels 112 to 113, they move away from the downwardly disposed portions of the rods 106, and therefore the pins 107 are withdrawn within the casing or body 8 behind the said rods 96. But, when the chain belts 115 pass from the sprocket wheels 113 to the sprocket wheels 114, they again assume parallel relation with the outer end portions of the rods 96, and pins 117 are projected up through the spaces between the said rods. The projecting portions of the pins at the last mentioned portion of the run of the said chain belts engages the cobs and carries the same under the lower edge of the valve 118, and conveys the same to the end of the body 8 and deposits them in a cob elevator hereinafter to be described.

The grain kernels and small particles of cob, together with the chaff which passes down through the spaces between the rods 96, falls upon the inclined bottom partition 99 of the body 8 and is directed toward the hopper 100. When the said material arrives at the lower edge of the bottom partition 99 it is encountered by a portion of the blast from the fan outlet 85, and the chaff and particles of cob are separated from the grain kernels, which latter fall into the hopper 100, while the chaff and particles of cob are blown away from the grain kernels over the valve 101 and out of the body 8 of the machine. The said valve 101 may be swung upon its hinge or pivot to regulate the quantity of air which will pass through the space between the upper edge of the hopper 100 and the lower edge of the bottom partition 99 of the body 8. From the hopper 100 the grain passes into the basin 102, where it is engaged by the grain auger 103 and conveyed to one side of the body 8 of the machine. At that side of the machine to which the grain is conveyed it is caught up by the vanes or buckets 110 upon the chain belt 109, and is elevated along the elevator trunk 105. At the upper end of the said trunk 105 the grain is cast laterally from the buckets 110 as they pass over the shaft 106, and is thrown into the chute 119, from whence it may be directed by a spout 120, into a wagon body or other receptacle.

The cob elevator above referred to consists of a trunk 121, which is pivotally mounted at that end of the bed 1 opposite the end thereof upon which the derrick 50 is mounted. Inasmuch as such mounting of a cob elevator is common, it is thought unnecessary to go into further details to explain such mounting in this specification.

A shaft 122 is journaled for rotation upon the bed 1, and a sprocket wheel 123 is mounted upon the shaft 122. A sprocket wheel 124 is mounted upon the shaft of the engine 9, and the sprocket chain 125 passes around the sprocket wheels 123 and 124. A beveled pinion 126 is fixed to the shaft 122 and meshes with one set of teeth of a double beveled pinion 127, which is journaled for rotation upon the standard 128 mounted upon the bed 1 of the machine. A shaft 129 is journaled for rotation at the inner end of the trunk 121, and a beveled pinion 130 is fixed to the shaft 129, and meshes with the other set of teeth of the double beveled pinion 127. Sprocket wheels 131 are fixed to the shaft 129 and the chain belts 132 pass around the sprocket wheels 131, and similar sprocket wheels (not shown) which are located at the upper and outer end of the trunk 121. The upstanding pins 133 are carried by the chain belts 132, and are adapted to engage the cobs when they are deposited in the lower end of the conveyer trunk 121, and elevate the same to the outer end of the said trunk. The valve 134 is pivotally connected at its upper edge with the side of the trunk 121 at the lower end thereof, and the lower edge of the said valve 134 rests loosely upon the lower portions of the upper runs of the sprocket chains 132. When the cobs fall from the outer ends of the rods 96 into the inner end of the trunk 121, they accumulate against the valve 134, and as the pins 133 pass under the lower edge of the said valve 134 the valve is moved laterally at its lower portion and the said cobs are prevented from banking or choking in the lower portion of the trunk 121. Thus the valve 134 serves as a stirrer for the cobs at the lower portion of the said trunk 121. A cable 135 is connected at one end with the said trunk 121 at a point intermediate of the ends thereof, and the opposite end of the said cable 135 is adapted to engage with a hook 136, mounted upon the top of the body 8 of the machine. By drawing the cable 135, the trunk 121 may be pitched at any desired angle with relation to the ground.

Having described my invention, what I claim, and desire to secure, by Letters Patent, is:—

1. A corn sheller comprising a body, shelling mechanism located therein, a feeder trunk attached to the sheller and having a lower spoon-shaped extremity adapted to rest upon the ground, a conveyer mounted for movement along the said trunk, and ear picking and casting devices located at the end of the spoon-shaped extremity of the trunk and adapted to direct ears toward the said conveyer.

2. A corn sheller comprising a body, shelling mechanism mounted therein, an ear-feeding trunk connected with the sheller and having a lower extremity spoon-shaped and adapted to rest upon the ground, an endless conveyer mounted for movement in the said trunk, ear-picking and casting fingers mounted for movement about an axis at the extremity of the spoon-shaped portion of the trunk, and partition members located between the said picking fingers and disposed toward the said conveyer.

In testimony that I claim the foregoing as my own, I have hereto affixed my signature in the presence of two witnesses.

GERRIT WANDSCHEER.

Witnesses:
 JACOB WANDSCHEER,
 A. B. ROBINSON.